(12) United States Patent
Oue et al.

(10) Patent No.: US 12,415,423 B2
(45) Date of Patent: Sep. 16, 2025

(54) DISPLAY APPARATUS

(71) Applicant: Panasonic Intellectual Property Management Co., Ltd., Osaka (JP)

(72) Inventors: Hiroya Oue, Kanagawa (JP); Yasuhiro Takada, Kanagawa (JP); Tetsuro Komatsu, Kanagawa (JP); Tatsuya Muraoka, Kanagawa (JP); Motoki Asari, Tokyo (JP); Mayu Ofuji, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 302 days.

(21) Appl. No.: 18/116,063

(22) Filed: Mar. 1, 2023

(65) Prior Publication Data

US 2023/0278427 A1 Sep. 7, 2023

(30) Foreign Application Priority Data

Mar. 7, 2022 (JP) .................. 2022-034364

(51) Int. Cl.
*B60K 35/00* (2024.01)
*B60K 35/28* (2024.01)
*B60K 35/81* (2024.01)

(52) U.S. Cl.
CPC .............. *B60K 35/00* (2013.01); *B60K 35/28* (2024.01); *B60K 35/81* (2024.01); *B60K 2360/16* (2024.01); *B60K 2360/27* (2024.01)

(58) Field of Classification Search
CPC .. B64D 45/00; B64D 2045/009; G08B 17/00; G08B 29/188; A62C 3/08; B60K 35/00; B60K 35/28; B60K 35/81; B60K 2360/16; B60K 2360/27; B60K 35/22; B60K 2360/191; B60K 35/29; B60K 35/60; B60K 35/213

See application file for complete search history.

(56) References Cited

U.S. PATENT DOCUMENTS 6,906,634 B1 * 6/2005 Kuenzner .............. B60K 35/60
340/688
11,602,993 B1 * 3/2023 Evans .................... B60K 35/00

FOREIGN PATENT DOCUMENTS

JP 2009-015284 1/2009
JP 2009-128307 6/2009
(Continued)

OTHER PUBLICATIONS

Office Action from Japan Patent Office (JPO) in Japanese Patent Appl. No. 2022-034364, dated May 7, 2025, together with an English language translation.

*Primary Examiner* — James J Lee
*Assistant Examiner* — Alexander George Matta
(74) *Attorney, Agent, or Firm* — Greenblum & Bernstein, P.L.C.

(57) ABSTRACT

A display panel is capable of displaying at least one meter image including a pointer image constituting a pointer and a mark image constituting a mark that the pointer is adapted to point to. A processor controls display status of the mark image. The processor causes the mark image to be displayed on the display panel in a first display mode when the pointer image does not point to the mark image and causes the mark image to be displayed on the display panel in a second display mode when the pointer image points to the mark image. The first display mode and the second display mode are different.

10 Claims, 10 Drawing Sheets

(56) References Cited

FOREIGN PATENT DOCUMENTS

| JP | 4404135 | 1/2010 |
| JP | 5202861 | 6/2013 |
| JP | 5795913 | 10/2015 |
| JP | 2021-071368 | 5/2021 |

* cited by examiner

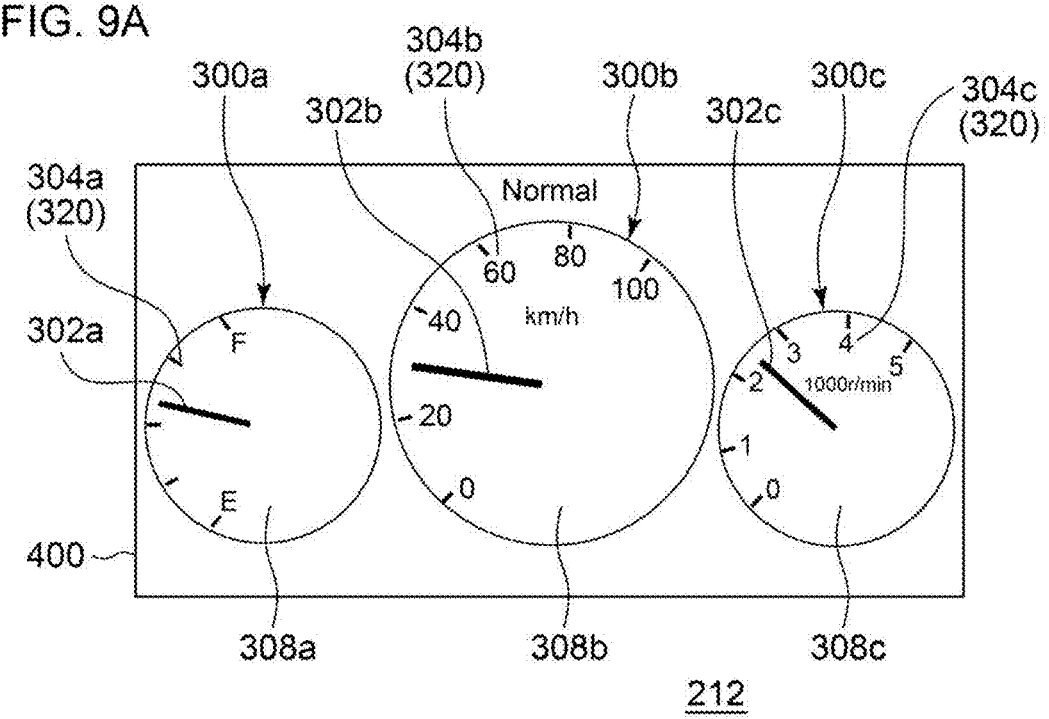
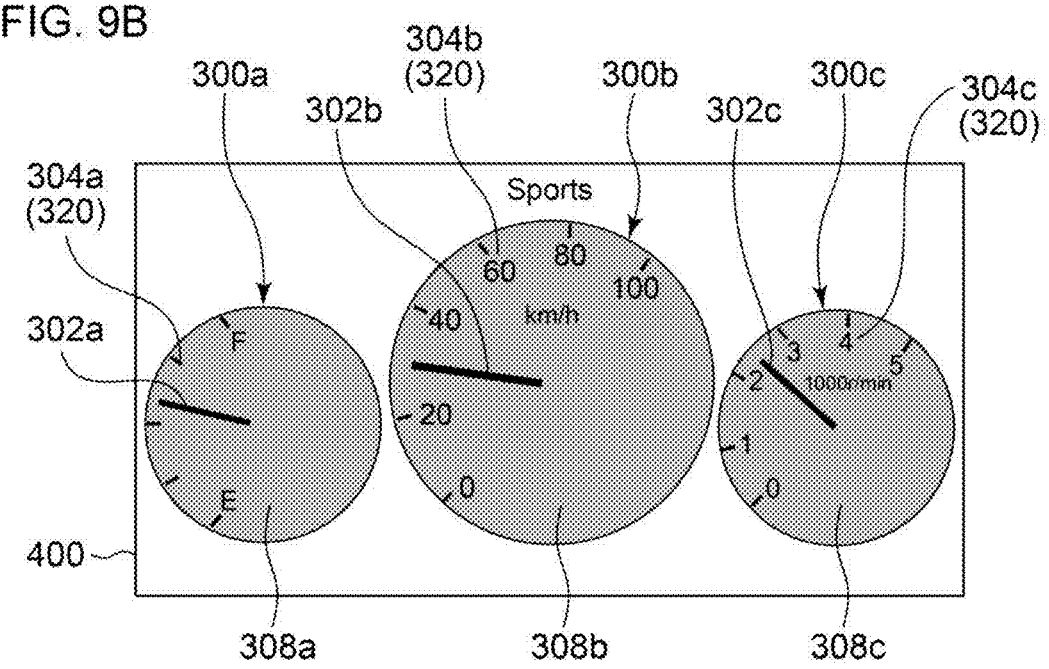

DISPLAY APPARATUS

BACKGROUND

1. Field

The present disclosure relates to display apparatuses.

2. Description of the Related Art

Some display apparatuses for vehicles are configured to cause a pointer image constituting a pointer and a mark image constituting a mark to be displayed on a display panel. When a pointer image and a mark image overlap in the display apparatus, the portion of the pointer image overlapping the mark image is displayed in brightness or hue different from the brightness or hue of the portion of the pointer image elsewhere (see, for example, patent literature 1).

[Patent literature 1] JP2009-15284

Human eyes are characterized in that "the cognition capability is lowered for objects moving fast". For example, the faster the pointer moves in a display apparatus, the more difficult it may be for human eyes to recognize the portion pointed to by the pointer.

SUMMARY

The present disclosure addresses the above-described issue, and a purpose thereof is to provide a technology of suppressing a drop in the visibility of a meter image even when a pointer image is moving.

A display apparatus according to an embodiment of the present disclosure includes: a display panel adapted to display at least one meter image including a pointer image constituting a pointer and a mark image constituting a mark that the pointer is adapted to point to; and a display controller that controls the display panel, wherein the display controller causes the display panel to display the mark image in a first display mode when the pointer image does not point to the mark image and causes the display panel to display the mark image in a second display mode when the pointer image points to the mark image, and the first display mode and the second display mode are different.

Optional combinations of the aforementioned constituting elements, and implementations of the disclosure in the form of methods, apparatuses, systems, recording mediums, and computer programs may also be practiced as additional modes of the present disclosure.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIGS. 9A-9B show examples of the meter screen displayed on the display panel of FIG. 2.

DETAILED DESCRIPTION

The invention will now be described by reference to the preferred embodiments. This does not intend to limit the scope of the present invention, but to exemplify the invention.

Before describing the embodiment in specific details, a summary of the embodiment will be described. The embodiment relates to a display apparatus for electronically displaying images of various meters. The display apparatus is provided, for example, in an instrument panel of a vehicle. Hereinafter, images showing various meters will be referred to as "meter images". The meter image is, for example, an image of a fuel meter, an image of a speed meter, and an image of a tachometer. A meter image includes a pointer image constituting a pointer and a mark image constituting a mark that the pointer is adapted to point to. In the related art, the portion of the pointer image overlapping the mark image and the portion not overlapping the mark image may sometimes be displayed in different levels of brightness or hue in order to improve the visibility of the mark image when the pointer image and the mark image are displayed to overlap each other. Meanwhile, the cognition capability of human eyes is lowered for objects moving fast so that it may be difficult to recognize a moving pointer image. It is therefore useful to suppress a drop in the visibility of the mark image even when the pointer image is moving. In this embodiment, the display mode of the mark image is changed when the mark image and the movable pointer image overlap.

Figure 1:
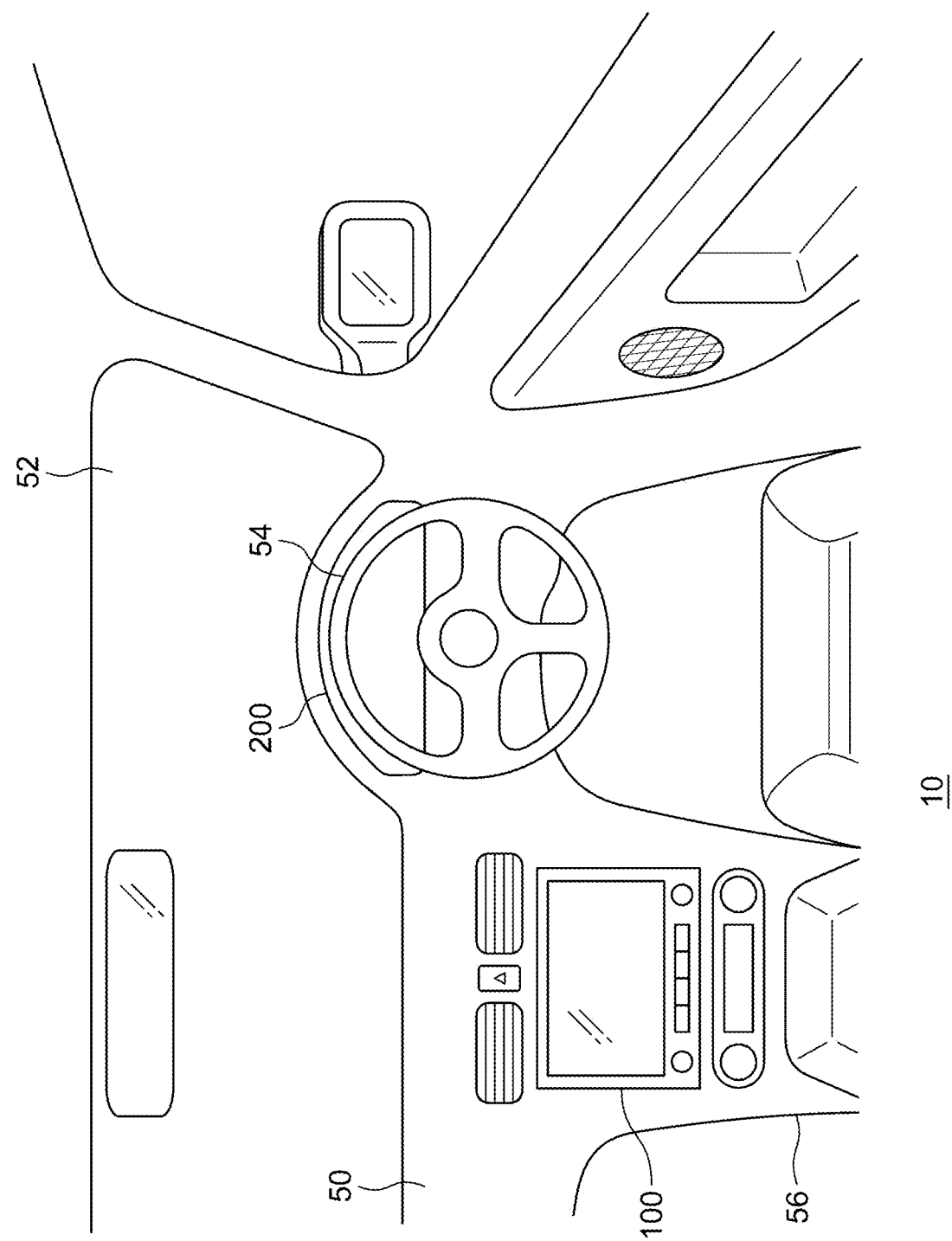
FIG. 1 shows a structure in a vehicle cabin of a vehicle according to the embodiment.

FIG. 1 shows a structure in a vehicle cabin of a vehicle 10. A windshield 52 is provided in front of a dashboard 50 provided frontward in the vehicle cabin. A steering wheel 54 is provided to the right of the dashboard 50. The steering wheel 54 may be provided to the left of the dashboard 50. A display apparatus 200 is provided in front of the steering wheel 54, and, for example, in an instrument panel of the vehicle 10. The display apparatus 200 is also referred to as an electronically displayed meter. A center console 56 extending vertically is provided in the central portion of the dashboard 50. A vehicle-mounted monitor 100 is set within the center console 56. The vehicle-mounted monitor 100 displays, for example, a map image of a car navigation system.

Figure 2:
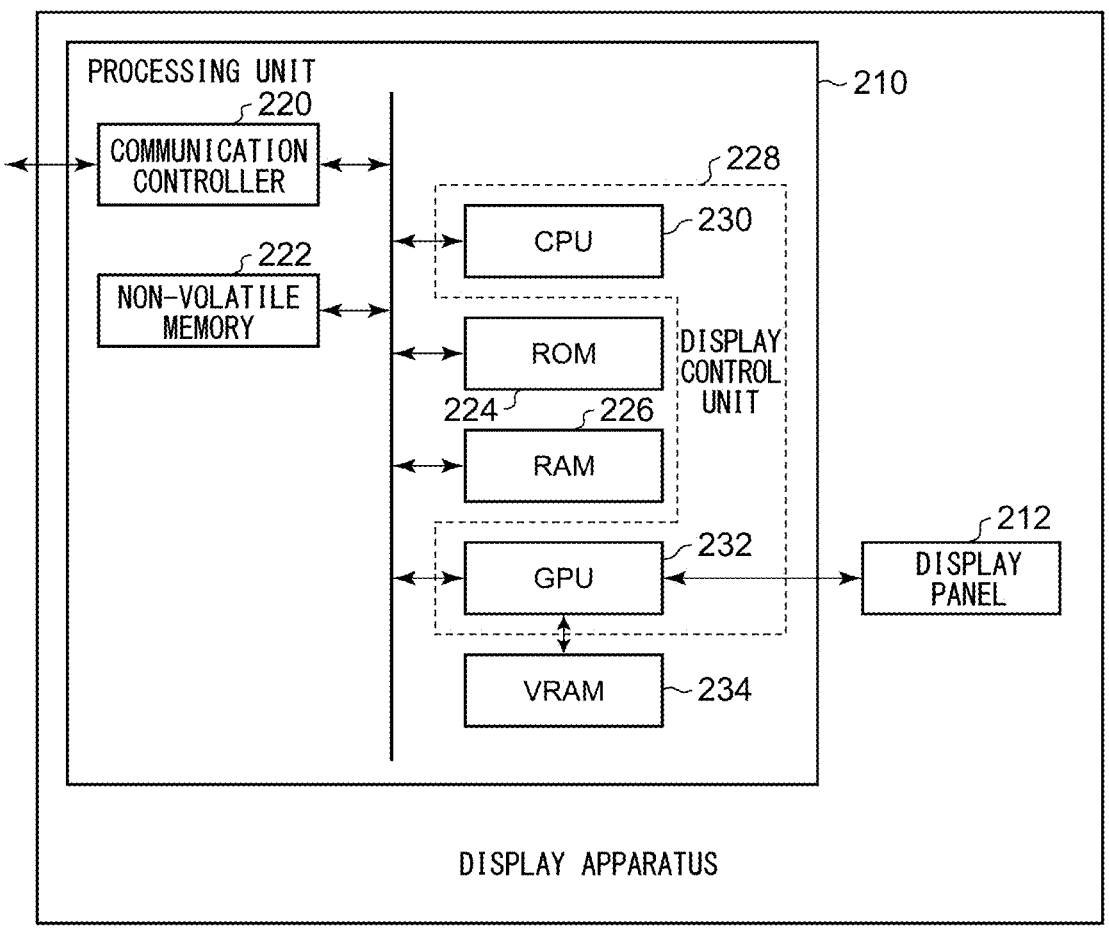
FIG. 2 shows a configuration of the display apparatus of FIG. 1.

FIG. 2 shows a configuration of the display apparatus 200. The display apparatus 200 includes a processing unit 210 and a display panel 212. The processing unit 210 includes a communication controller 220, a non-volatile memory 222, a ROM 224, a RAM 226, a central processing unit (CPU) 230, a graphics processing unit (GPU) 232, and a video random access memory (VRAM) 234. The CPU 230 and the GPU 232 may be packaged as a display control unit 228.

The communication controller 220 receives vehicle information from various electronic control units (ECU) and various sensors via a vehicle-mounted network in accordance with a predetermined communication standard. The vehicle-mounted network is exemplified by a controller area network (CAN), a universal asynchronous receiver/transmitter (UART), a joint test action group (JTAG), etc. For example, the communication controller 220 receives fuel information from an ECU connected to a fuel sensor, receives vehicle speed information from an ECU connected to a vehicle speed sensor, and receives engine revolution information from an ECU for managing the engine. Further, the communication controller 220 receives average fuel cost information from an ECU. Further, the communication controller 220 is connected to an interface for acquiring information necessary for screen display from the driver. The communication controller 220 outputs the vehicle information received to the CPU 230.

The non-volatile memory 222 is a large capacity storage. For example, a flash memory or a hard disk is used as the non-volatile memory 222. The non-volatile memory 222 stores various application programs and various data. The non-volatile memory 222 also stores image data. The image data is inclusive of, for example, vertex data, texture data, polygon data, etc. of the parts constituting an image. The ROM 224 is a read-only non-volatile memory and stores firmware and basic data. The ROM 224 can store programs, image data, and polygon data that need not be rewritten. The RAM 226 is a read/write enabled volatile memory and is used as a work area of the CPU 230. The CPU 230 reads the program and data from the non-volatile memory 222 and the ROM 224 into the RAM 226 and performs various processes.

The GPU 232 is a custom IC specialized for image processes such as image rendering and color correction and generates an image that should be displayed on the display panel 212. The VRAM 234 is a read/write enabled volatile memory and is used as a work area of the GPU 232. For example, the VRAM 234 has an area for storing data dealt with in the GPU 232, a storage area for reading texture data, and a frame buffer area. The VRAM 234 stores polygon data and textures. The VRAM 234 may be incorporated into the RAM 226.

The display control unit 228, which includes the CPU 230 and the GPU 232, generates a meter screen showing a plurality of meters based on the vehicle information received from the communication controller 220. The meter screen generated in the display control unit 228 will be described later. The display control unit 228 displays the meter screen generated on the display panel 212. When the vehicle information received is updated, the display control unit 228 updates the meter screen and displays the updated information on the display panel 212. Thus, the display control unit 228 controls the display state of the display panel 212. The display panel 212 is a display. The display panel 212 is, for example, a liquid crystal display or an organic EL display. The display panel 212 displays an image output from the processing unit 210, i.e., a meter screen rendered by the GPU 232 in the frame buffer.

Figure 3:
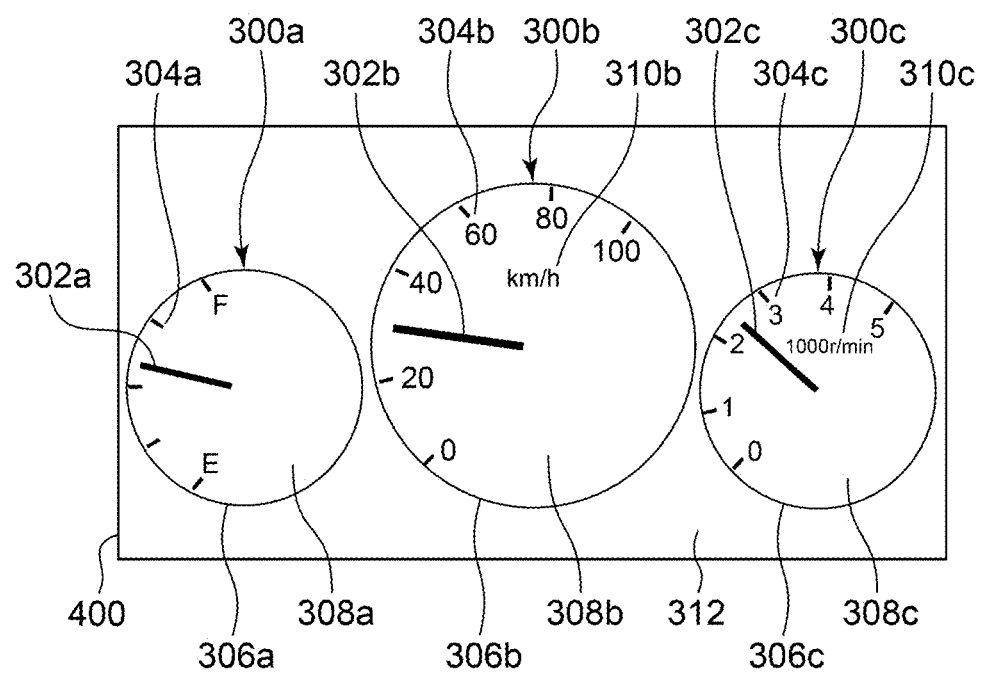
FIG. 3 shows a basic configuration of a meter screen displayed on the display panel of FIG. 2.

To describe a meter screen generated by the display control unit 228 and displayed on the display panel 212, FIG. 3 will also be used. FIG. 3 shows a basic configuration of a meter screen 400 displayed on the display panel 212. A first meter image 300a is provided at the left end of the meter screen 400 shown in FIG. 3, a second meter image 300b is provided to the right of the first meter image 300a, and a third meter image 300c is provided to the right of the second meter image 300b. The first meter image 300a, the second meter image 300b, and the third meter image 300c are generically referred to as meter images 300. A background image 312 is provided in the meter screen 400 to encircle the plurality of meter images 300. In this way, a plurality of meter images 300 and the background image 312 are displayed simultaneously in the meter screen 400. The number of meter images 300 in FIG. 3 is "3", but the number of meter images 300 may be "2". In that case, the third meter image 300c is omitted. Alternatively, the number of meter images 300 may be "4" or more.

The first meter image 300a is, for example, an image of a fuel meter. The first meter image 300a includes a first pointer image 302a, a first mark image 304a, a first outer frame image 306a, and a first dial face image 308a. The first pointer image 302a constitutes a pointer. The first mark image 304a constitutes a mark pointed to by the first pointer image 302a. The first outer frame image 306a constitutes a circular outer frame encircling the first mark image 304a. The first dial face image 308a constitutes a dial face positioned inside the first mark image 304a. The display control unit 228 of FIG. 2 determines the angle of the first pointer image 302a relative to the first mark image 304a based on the fuel information received from the communication controller 220 and generates the first meter image 300a in which the first pointer image 302a is oriented in the angle determined.

The second meter image 300b is, for example, an image of a speed meter. The second meter image 300b includes a second pointer image 302b, a second mark image 304b, a second outer frame image 306b, a second dial face image 308b, and a second unit image 310b. The second pointer image 302b, the second mark image 304b, the second outer frame image 306b, and the second dial face image 308b are shown in a manner similar to that of the first pointer image 302a, the first mark image 304a, the first outer frame image 306a, and the first dial face image 308a, respectively. The second unit image 310b shows a unit of the mark. The display control unit 228 of FIG. 2 determines the angle of the second pointer image 302b relative to the second mark image 304b based on the speed information received from the communication controller 220 and generates the second meter image 300b in which the second pointer image 302b is oriented in the angle determined.

The third meter image 300c is, for example, an image of a tachometer. The third meter image 300c includes a third pointer image 302c, a third mark image 304c, a third outer frame image 306c, a third dial face image 308c, and a third unit image 310c. The third pointer image 302c, the third mark image 304c, the third outer frame image 306c, the third dial face image 308c, and the third unit image 310c are shown in a manner similar to that of the second pointer image 302b, the second mark image 304b, the second outer frame image 306b, the second dial face image 308b, and the second unit image 310b, respectively. The display control unit 228 of FIG. 2 determines the angle of the third pointer image 302c relative to the third mark image 304c based on the revolution information received from the communication controller 220 and generates the third meter image 300c in which the third pointer image 302c is oriented in the angle determined.

The first pointer image 302a, the second pointer image 302b, and the third pointer image 302c are generically referred to as pointer images 302. The first mark image 304a, the second mark image 304b, and the third mark image 304c are generically referred to as mark images 304. The first outer frame image 306a, the second outer frame image 306b, and the third outer frame image 306c are generically referred to as outer frame images 306. The first dial face image 308a, the second dial face image 308b, and the third dial face image 308c are generically referred to as dial face images 308. The second unit image 310*b* and the third unit image 310*c* are generically referred to as unit images 310.

The third mark image 304*c* in the third meter image 300*c* shows numerals "0", "1", "2", "3", "4", and "5". The third pointer image 302*c* moves (rotates) in accordance with the change in the revolving speed of the engine. Overlapping of the third pointer image 302*c* on any of the numerals makes it difficult to see that numeral. It also makes it difficult to see the third pointer image 302*c* in motion. This is addressed by using the display control unit 228 to control the display of the third mark image 304*c* as described below.

Figure 4:
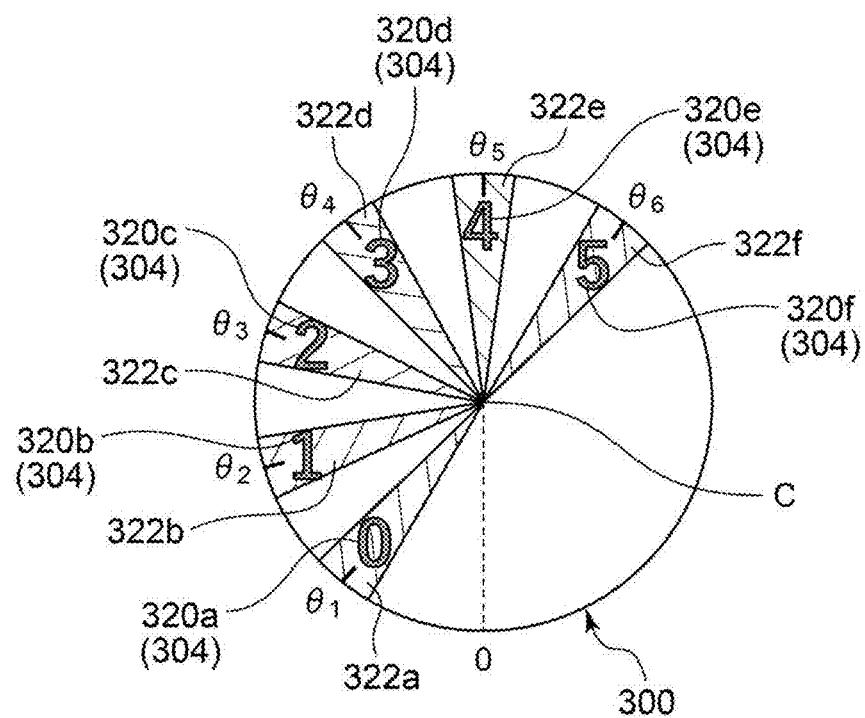
FIG. 4 shows an outline of the process in the display control unit of FIG. 2.

FIG. 4 shows an outline of the process in the display control unit 228. The figure shows a process whereby the display control unit 228 determines an angle (hereinafter, "pointer angle") of the third pointer image 302*c* in accordance with the revolving speed of the engine. For clarity of the description, the third meter image 300*c*, the third pointer image 302*c*, the third mark image 304*c*, etc. may hereinafter be indicated as the meter image 300, the pointer image 302, and the mark image 304. The numerals "0", "1", "2", "3", "4", and "5" in the mark image 304 are respectively shown as a first value image 320*a*, a second value image 320*b*, a third value image 320*c*, a fourth value image 320*d*, a fifth value image 320*e*, and a sixth value image 320*f*.

The display control unit 228 defines a coordinate system in which the 6 o'clock direction of FIG. 4 is "0 degrees" and the pointer angle increases in the clockwise direction. In this coordinate system, a predetermined angular range centered at the angle θ1 is a first mark range 322*a*, a predetermined angular range centered at the angle θ2 is a second mark range 322*b*, a predetermined angular range centered at the angle θ3 is a third mark range 322*c*, a predetermined angular range centered at the angle θ4 is a fourth mark range 322*d*, a predetermined angular range centered at the angle θ5 is a fifth mark range 322*e*, and a predetermined angular range centered at the angle θ6 is a sixth mark range 322*f*.

The first mark range 322*a* includes at least a portion of the first value image 320*a*, the second mark range 322*b* includes at least a portion of the second value image 320*b*, the third mark range 322*c* includes at least a portion of the third value image 320*c*, the fourth mark range 322*d* includes at least a portion of the fourth value image 320*d*, the fifth mark range 322*e* includes at least a portion of the fifth value image 320*e*, and the sixth mark range 322*f* includes at least a portion of the sixth value image 320*f*. The first mark range 322*a* may include the whole of the first value image 320*a*, the second mark range 322*b* may include the whole of the second value image 320*b*, the third mark range 322*c* may include the whole of the third value image 320*c*, the fourth mark range 322*d* may include the whole of the fourth value image 320*d*, the fifth mark range 322*e* may include the whole of the fifth value image 320*e*, and the sixth mark range 322*f* may include the whole of the sixth value image 320*f*. Further, the revolving speed of the engine of 0 r/min is mapped to the angle θ1, the revolving speed of the engine 1000 r/min is mapped to the angle θ2, the revolving speed of the engine 2000 r/min is mapped to the angle θ3, the revolving speed of the engine 3000 r/min is mapped to the angle θ4, the revolving speed of the engine 4000 r/min is mapped to the angle θ5, and the revolving speed of the engine 5000 r/min is mapped to the angle θ6.

The display control unit 228 maintains the correspondence between the revolving speed of the engine and the pointer angle and identifies the pointer angle from the revolving speed of the engine. When the revolving speed of the engine is 1000 r/min, for example, the display control unit 228 identifies the angle θ2 as the pointer angle. When the identified pointer angle is included in the mark range 322, the display control unit 228 determines that the pointer image 302 points to the mark image 304 or that the pointer image 302 overlaps the mark image 304. When the pointer angle is not included in the mark range 322, on the other hand, the display control unit 228 determines that the pointer image 302 does not point to the mark image 304 or that the pointer image 302 does not overlap the mark image 304.

Figure 5A:
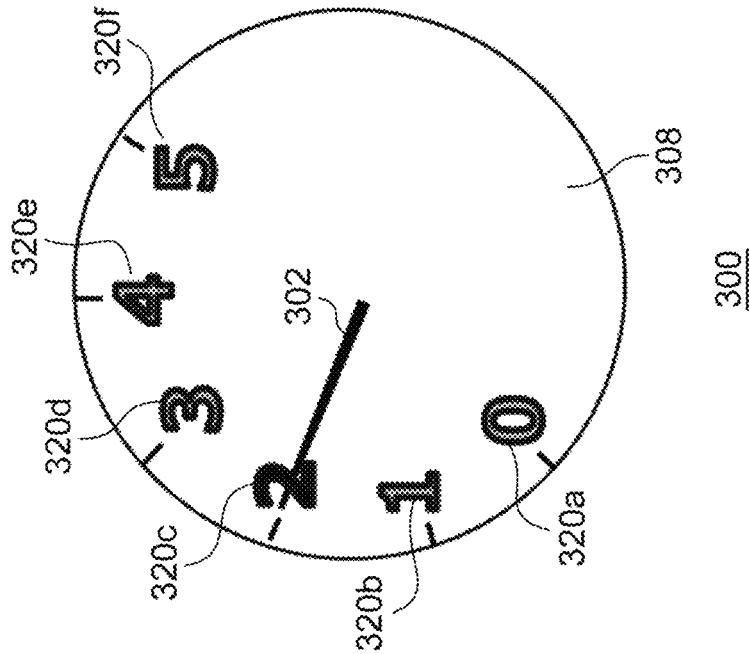
FIGS. 5A-5B show examples of the meter image displayed on the display panel of FIG. 2.
Figure 5B:
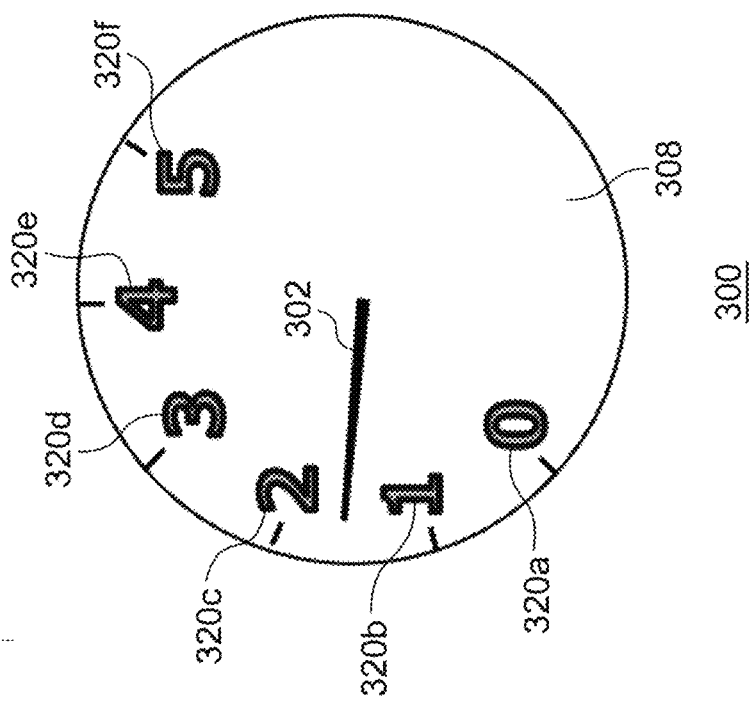

FIGS. 5A-5B show examples of the meter image 300 displayed on the display panel 212. In the meter image 300, the first value image 320*a* through the sixth value image 320*f* are shown as numerals having edges. The transparency inward of the edge of the first value image 320*a* through the sixth value image 320*f* can be changed. Hereinafter, the transparency inward of the edge of the first value image 320*a* through the sixth value image 320*f* may be referred to as the transparency of the first value image 320*a* through the sixth value image 320*f*. FIG. 5A shows an example of the meter image 300 displayed in the case that the display control unit 228 determines that the pointer image 302 does not point to any of the mark images 304. The pointer image 302 does not point to any of the first value image 320*a* through the sixth value image 320*f*. The portion inward of the edge of the first value image 320*a* through the sixth value image 320*f* is shown to be semi-transparent.

FIG. 5B shows an example of the meter image 300 displayed in the case that the display control unit 228 determines that the pointer image 302 points to the mark image 304 (e.g., the third value image 320*c*). The pointer image 302 points to the third value image 320*c*. The third value image 320*c* is shown in zero transparency. In other words, the third value image 320*c* is shown such that the portion inward of the edge is filled with a color. Meanwhile, the first value image 320*a*, the second value image 320*b*, the fourth value image 320*d* through the sixth value image 320*f* are shown, as previously, such that the portion inward of the edge is semi-transparent.

The display mode of the value image 320 not pointed to by the pointer image 302 will be referred to as the "first display mode", and the display mode of the value image 320 pointed to by the pointer image 302 will be referred to as the "second display mode". The first display mode is used for all of the value images 320 of FIG. 5A and for the first value image 320*a*, the second value image 320*b*, the fourth value image 320*d* through the sixth value image 320*f* of FIG. 5B, and the second display mode is used for the third value image 320*c* of FIG. 5B. The display control unit 228 configures the transparency of the value image 320 displayed in the second display mode to be lower than the transparency of the value image 320 displayed in the first display mode.

The value image 320 not pointed to by the pointer image 302 may be shown in zero transparency, and the value image 320 pointed to by the pointer image 302 may be shown such that the portion inward of the edge is semi-transparent. In other words, the value image 320 in the first display mode may be shown in zero transparency, and the portion inward of the edge of the value image 320 in the second display mode may be shown to be semi-transparent. In this case, the display control unit 228 configures the transparency of the value image 320 in the second display mode to be higher than the transparency of the value image 320 in the first display mode. To summarize the above, the display control unit 228 can be said to make the first display mode and the second display mode different by changing the transparency of the value image 320 in the first display mode and in the second display mode.

The features are implemented in hardware such as a central processing unit (CPU), a memory, or other large scale integration (LSI), of any computer and in software such as a program loaded into a memory. The figure depicts functional blocks implemented by the cooperation of these elements. Therefore, it will be understood by those skilled in the art that the functional blocks may be implemented in a variety of manners by hardware only or by a combination of hardware and software.

Figure 6:
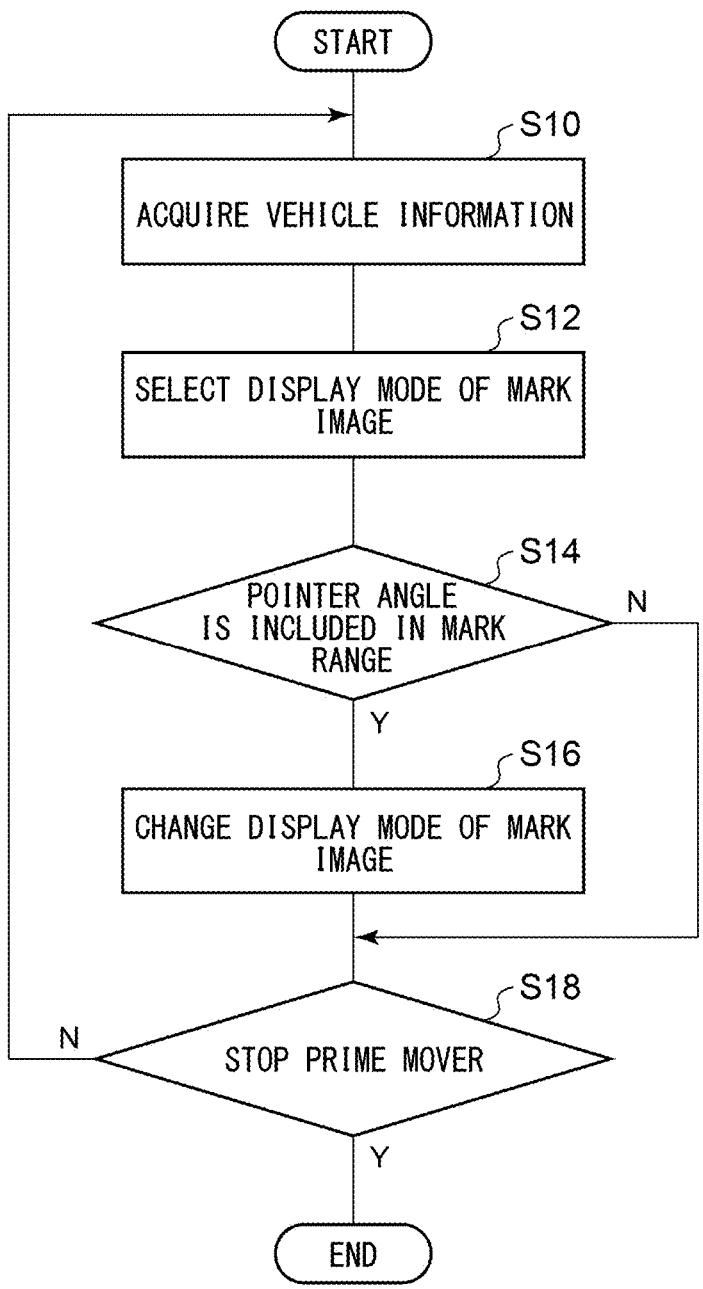
FIG. 6 is a flowchart showing a sequence of display steps performed by the display apparatus of FIG. 2.

A description will be given of the operation of the display apparatus 200 having the above-described configuration. FIG. 6 is a flowchart showing a sequence of display steps performed by the display apparatus 200. The display control unit 228 acquires vehicle information (S10). The display control unit 228 selects a display mode of the mark image 304 (S12). When the pointer angle is included in the mark range (Y in S14), the display control unit 228 changes the display mode of the relevant mark image 304 (S16). When the pointer angle is not included in the mark range (N in S14), step 16 is skipped. When the prime mover of the vehicle 10 (e.g., the engine or the motor) is not stopped (N in S18), control returns to step 10. When the prime mover of the vehicle 10 is stopped (Y in S18), the process is terminated.

A description will be given below of a variation of the meter screen 400.

(Variation 1)

The first display mode in variation 1 is the same as that of the embodiment. In other words, the transparency of the value image 320 is fixed at a semi-transparent or zero-transparency constant value in the first display mode. Meanwhile, the second display mode in variation 1 differs from that of the embodiment.

Figure 7A:
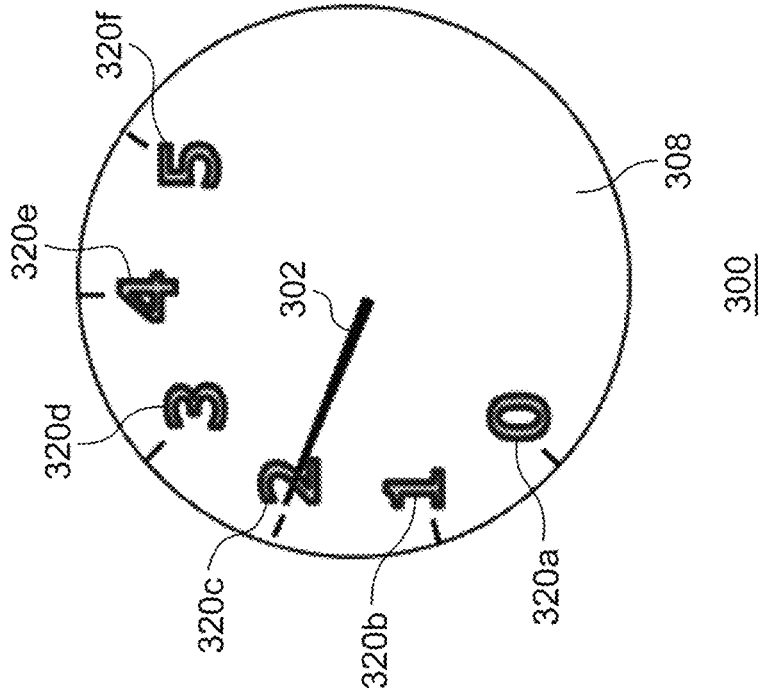
FIGS. 7A-7B show further examples of the meter image displayed on the display panel of FIG. 2.
Figure 7B:
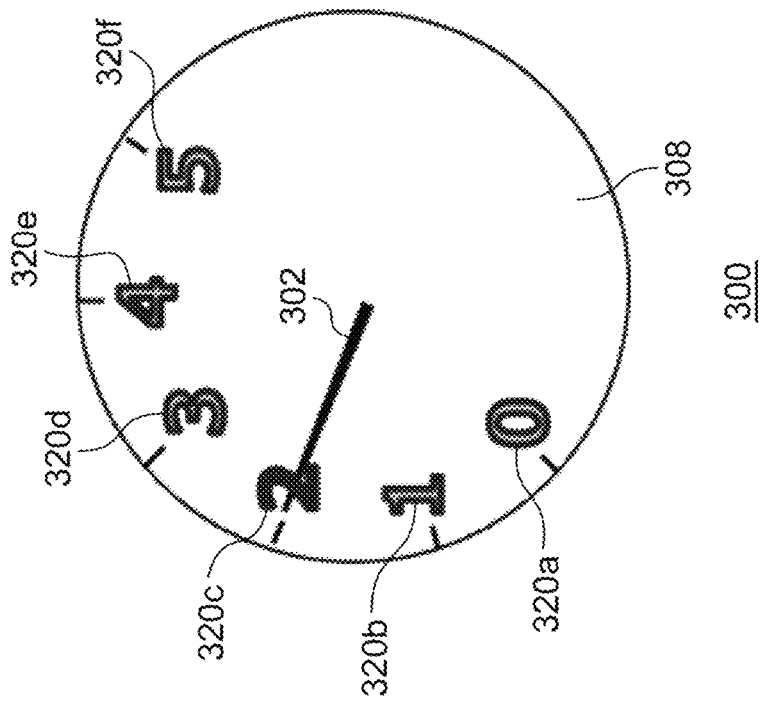

FIGS. 7A-7B show further examples of the meter image 300 displayed on the display panel 212. The figures show examples of the meter image 300 displayed in the case that the display control unit 228 determines that the pointer image 302 points to the mark image 304 (e.g., the third value image 320c).

FIG. 7A shows the display in the first stage. The figure is identical to FIG. 5B, and the third value image 320c is shown in zero transparency. Meanwhile, the portion inward of the edge of the first value image 320a, the second value image 320b, and the fourth value image 320d through the sixth value image 320f is shown to be semi-transparent. FIG. 7B shows the display in the second stage following the first stage. The portion inward of the edge of the third value image 320c changes from zero transparency to semi-transparency. The first value image 320a, the second value image 320b, the fourth value image 320d through the sixth value image 320f have the same transparency as that of the first stage. Therefore, all of the value images 320 are shown in the same transparency in the second stage. Following the second stage, the display in the first stage is performed. Thereafter, the first stage and the second stage are displayed alternately at regular intervals. Periodical changes in the transparency of the third value image 320c show the third value image 320c as blinking. The display mode like this represents the second display mode in variation 1.

(Variation 2)

In the embodiment and variation 1, when the pointer image 302 changes from not pointing to the value image 320 to pointing to the value image 320, the transparency of the relevant value image 320 is changed. In variation 2, when the pointer image 302 changes from not pointing to the value image 320 to pointing to the value image 320, the font for the relevant value image 320 is changed.

Figure 8A:
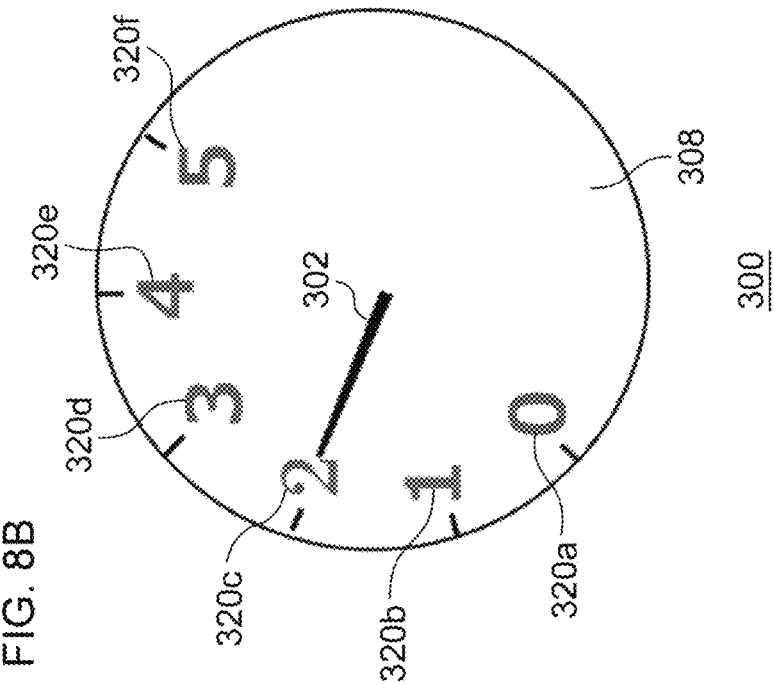
FIGS. 8A-8B show still further examples of the meter image displayed on the display panel of FIG. 2.
Figure 8B:
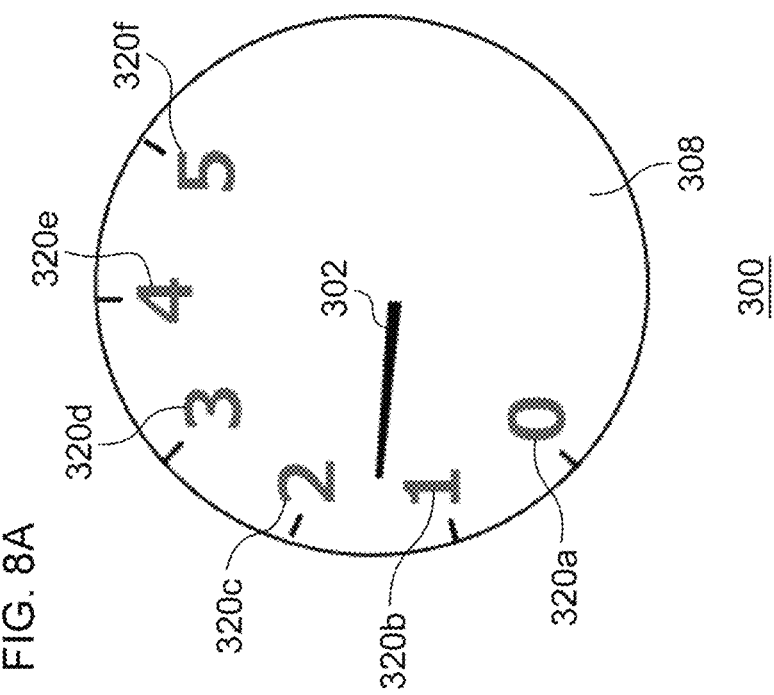

FIGS. 8A-8B show still further examples of the meter image 300 displayed on the display panel 212. FIG. 8A shows the meter image 300 displayed in the case that the display control unit 228 determines that the pointer image 302 does not point to any mark image 304. The pointer image 302 does not point to any of the first value image 320a through the sixth value image 320f. The first value image 320a through the sixth value image 320f are shown in, for example, a "Gothic" font. This represents the first display mode.

FIG. 8B shows the meter image 300 displayed in the case that the display control unit 228 determines that the pointer image 302 points to the mark image 304 (e.g., the third value image 320c). The pointer image 302 points to the third value image 320c. The font for the third value image 320c is changed from "Gothic" "Mincho". This represents the second display mode. Meanwhile, the first value image 320a, the second value image 320b, the fourth value image 320d through the sixth value image 320f are all shown, as previously, in a "Gothic" front. In other words, the font of the value image 320 is changed in the first display mode and in the second display mode. The font used for the value image 320 is not limited to "Gothic" and "Mincho".

(Variation 3)

The second display mode presented in variation 1 (hereinafter, "changing display mode") and the second display mode presented in the embodiment and variation 2 (hereinafter, "fixed display mode") may be used in combination. In the case the red zone of a tachometer is "5000 r/min" or higher, the first value image 320a through the fifth value image 320e of FIG. 5B indicate the revolving speed that has not reached the red zone, and the sixth value image 320f indicates the revolving speed in the red zone. When the pointer image 302 does not point to any of the value images 320, the display control unit 228 displays all of the value images 320 in the first display mode. Further, when the pointer image 302 points to one of the first value image 320a through the fifth value image 320e, the display control unit 228 displays one of the first value image 320a through the fifth value image 320e in the fixed display mode and displays the rest of the first value image 320a through the fifth value image 320e and the sixth value image 320f in the first display mode. Further, when the pointer image 302 points to the sixth value image 320f, the display control unit 228 displays the sixth value image 320f in the changing display mode and displays the first value image 320a through the fifth value image 320e in the first display mode.

(Variation 4)

In the embodiment and in variations 1 through 3, the image of the tachometer, i.e., the third meter image 300c of FIG. 3, is described. However, the first display mode and the second display mode may be used for the image of the fuel meter, i.e., the first meter image 300a of FIG. 3 and the image of the speed meter, i.e., the second meter image 300b. Alternatively, the first display mode and the second display mode may be used for all of the first meter image 300a through the third meter image 300c included in the meter screen 400 of FIG. 3.

The pointer in the speed meter and the tachometer could move faster than the pointer in the fuel meter. In other words, the second pointer image 302b and the third pointer image 302c could move faster than the first pointer image 302a. In this case, the first display mode and the second display mode may be used for the second meter image 300b and the third meter image 300c included in the meter screen 400 of FIG. 3, and only the first display mode may be used for the first meter image 300a.

(Variation 5)

In variation 5, a plurality of display modes of the meter screen 400 are defined. When the display mode is switched, the meter screen 400 is switched. The display mode includes the first mode and the second mode. For example, the first mode is defined as "normal mode", and the second mode is defined as "sports mode".

FIGS. 9A-9B show examples of the meter screen 400 displayed on the display panel 212. FIG. 9A shows the meter screen 400 in the first mode, and the meter screen 400 includes the first meter image 300a, the second meter image 300b, and the third meter image 300c. Further, the meter screen 400 of FIG. 9A shows characters "Normal" above the second meter image 300b to let it know that the first mode is in effect.

In the first mode, the display control unit 228 displays all of the value images 320 in the first display mode when the pointer image 302 does not point to any of the value images 320. When the pointer image 302 points to one of the value images 320, on the other hand, the display control unit 228 displays, in the first mode, the relevant value image 320 in the second display mode described in the embodiment.

FIG. 9A shows the meter screen 400 in the second mode, and the meter screen 400 includes the first meter image 300a, the second meter image 300b, and the third meter image 300c. Further, the meter screen 400 of FIG. 9A shows characters "Sports" above the second meter image 300b to let it know that the second mode is in effect.

In the second mode, the display control unit 228 displays all of the value images 320 in the first display mode when the pointer image 302 does not point to any of the value images 320. When the pointer image 302 points to one of the value images 320, on the other hand, the display control unit 228 displays, in the second mode, the relevant value image 320 in the second display mode described in variation 2. In other words, mutually different second display modes are used in the first mode and in the second mode. The second display mode used in the second mode may be referred to as the third display mode.

(Variation 6)

In variation 6, too, a plurality of display modes of the meter screen 400 are defined. When the display mode is switched, the meter screen 400 is switched. The display mode includes the first mode and the second mode. The size of the meter image 300 differs in the first mode and in the second mode.

Figure 10A:
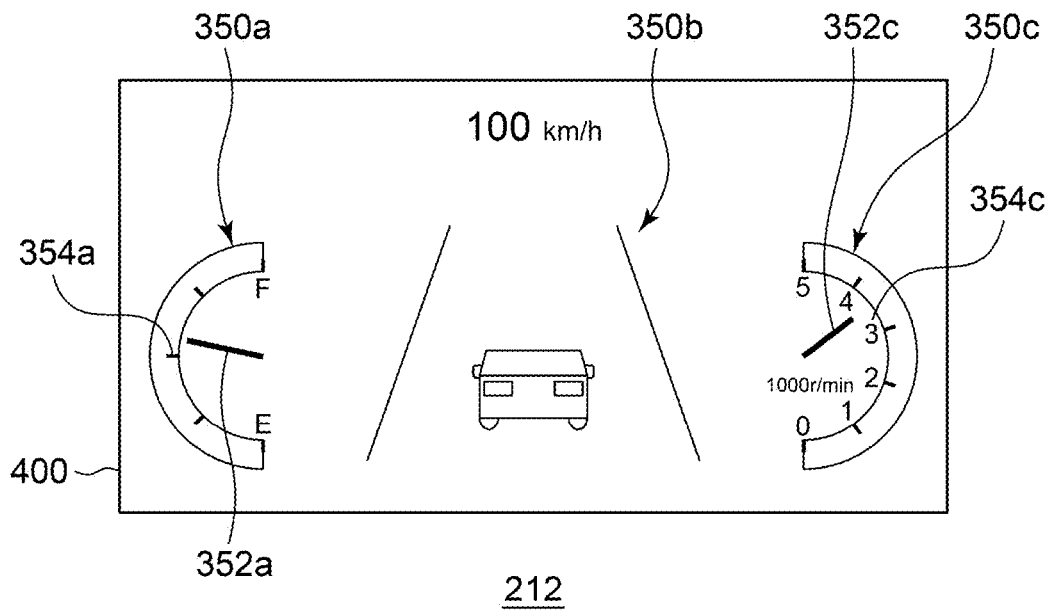
FIGS. 10A-10B show further examples of the meter screen displayed on the display panel of FIG. 2.
Figure 10B:
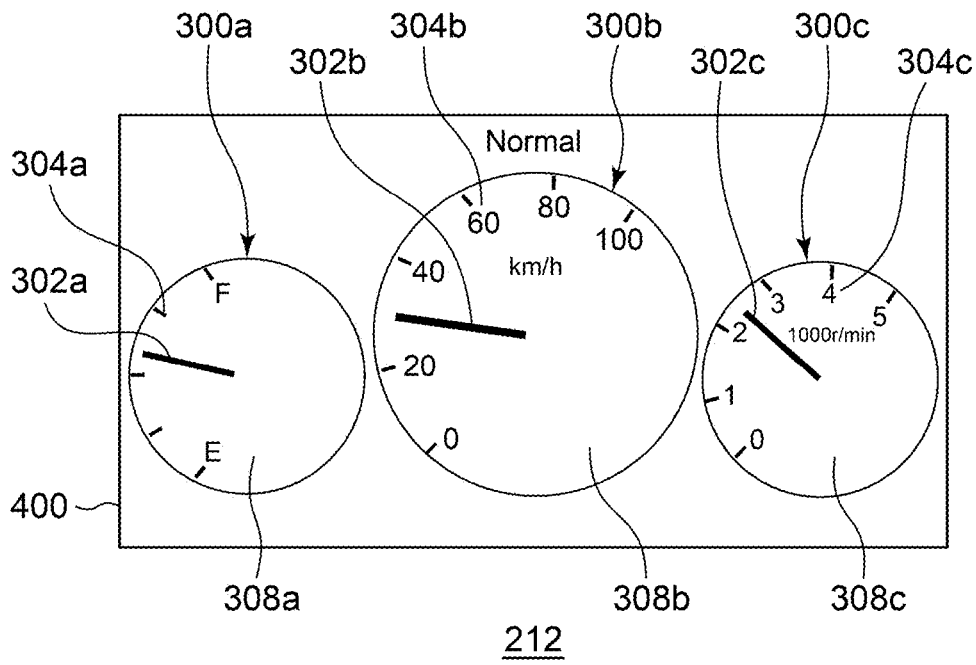

FIGS. 10A-10B show further examples of the meter screen 400 displayed on the display panel 212. FIG. 10A shows the meter screen 400 in the first mode. FIG. 10A shows the meters as similarly shown in FIG. 3. In the first mode, the display control unit 228 displays the mark image 304 only by using the first display mode and without using the second display mode.

FIG. 10B shows the meter screen 400 in the second mode. The meter screen 400 includes a first meter image 350a, a second meter image 350b, and a third meter image 350c. The first meter image 350a includes a first pointer image 352a and a first mark image 354a, and the third meter image 350c includes a third pointer image 352c and a third mark image 354c. The first meter image 350a and the third meter image 350c show the same detail as the first meter image 300a and the third meter image 300c, respectively. The first meter image 350a and the third meter image 350c are respectively shown in smaller sizes than the first meter image 300a and the third meter image 300c. In the second display mode, the display control unit 228 displays the mark image 354, switchably using the first display mode and the second display mode.

According to the embodiment, the display mode of the mark image is changed depending on whether the pointer image points to the mark image. Therefore, a drop in the visibility of the meter image is suppressed even when the pointer image is moving. Further, the transparency of the mark image is changed depending on whether the pointer image points to the mark image. Therefore, a drop in the visibility of the meter image is suppressed even when the pointer image is moving. Further, the transparency of the mark image is increased when the pointer image points to the mark image as compared with when the pointer image does not point to the mark image. Therefore, a drop in the visibility of the meter image is suppressed. Further, the transparency of the mark image is decreased when the pointer image points to the mark image as compared with when the pointer image does not point to the mark image. Therefore, a drop in the visibility of the meter image is suppressed.

Further, the transparency of the mark image is periodically changed when the pointer image points to the mark image. Therefore, a drop in the visibility of the meter image is suppressed. Further, the font of the mark image is changed depending on whether the pointer points to the mark image. Therefore, a drop in the visibility of the meter image is suppressed. Further, the first display mode and the second display mode are switchably used for the plurality of meter images displayed on the display panel. Therefore, a drop in the visibility of the meter image is suppressed.

Further, the first display mode and the second display mode are switchably used for the meter image including the pointer image moving fast, and only the first display mode is used for the meter image including the pointer image not moving fast. Therefore, a drop in the visibility of the meter image is suppressed even when the pointer image is moving. Further, the display mode is changed in accordance with the value image pointed to by the pointer image. Therefore, the value image pointed to by the pointer image is made more easily recognizable. Further, the display mode used when the pointer points to the mark image is changed in the first mode and tin the second mode so that the display mode is made more easily recognizable. Further, only the first display mode is used in the first mode, and the first display mode and the second display mode are used in the second mode. Therefore, the visibility of the mark image can be changed in accordance with the size of the meter image.

One embodiment of the present disclosure is summarized below. A display apparatus according to an embodiment of the present disclosure includes: a display panel adapted to display at least one meter image including a pointer image constituting a pointer and a mark image constituting a mark that the pointer is adapted to point to; a processor; and a memory that stores a program, wherein the processor reads the program to control display of the mark image on the display panel, the processor causes the mark image to be displayed on the display panel in a first display mode when the pointer image does not point to the mark image and causes the mark image to be displayed on the display panel in a second display mode when the pointer image points to the mark image, and the first display mode and the second display mode are different.

The processor causes the mark image in the first display mode and the mark image in the second display mode to be displayed on the display panel in different levels of transparency.

The processor configures the transparency of the mark image in the second display mode to be lower than the transparency of the mark image in the first display mode and displays the mark images on the display panel accordingly.

The processor configures the transparency of the mark image in the second display mode to be higher than the transparency of the mark image in the first display mode and displays the mark images on the display panel accordingly.

The processor causes the mark image in the first display mode to be displayed on the display panel, fixing the transparency of the mark image in the first display mode at one value and causes the mark image in the second display mode to be displayed on the display panel, periodically changing the transparency of the mark image in the second display mode.

The processor causes the mark image to be displayed on the display panel, changing a font of the mark image in the first display mode and in the second display mode.

The at least one meter image includes a first meter image and a second meter image, the first meter image includes a first pointer image that embodies the pointer image and a first mark image that embodies the mark image, and the second meter image includes a second pointer image that embodies the pointer image and a second mark image that embodies the mark image, and the processor causes the first mark image and the second mark image on the display panel, switchably using the first display mode and the second display mode.

The at least one meter image includes a first meter image and a second meter image, the first meter image includes a first pointer image that embodies the pointer image and a first mark image that embodies the mark image, and the second meter image includes a second pointer image that embodies the pointer image and a second mark image that embodies the mark image, and the processor causes the first mark image to be displayed on the display panel by using only the first display mode and causes the second mark image to be displayed on the display panel by switchably using the first display mode and the second display mode, and the second pointer image is adapted to move faster than the first pointer image.

The mark image includes a first value image indicating a first value and a second value image indicating a second value different from the first value, the processor causes the first value image and the second value image to be displayed on the display panel in the first display mode when the pointer image does not point to either the first value image or the second value image, causes the first value image to be displayed on the display panel in the second display mode and causes the second value image to be displayed on the first display panel in the first display mode when the pointer image points to the first value image, causes the first value image to be displayed on the display panel in the first display mode and causes the second value image to be displayed on the display panel in a third display mode when the pointer image points to the second value image, and the third display mode differs from either the first display mode or the second display mode.

The meter image is displayed in a first mode or a second mode, in the first mode, the processor causes the mark image to be displayed on the display panel in the first display mode when the pointer image does not point to the mark image and causes the mark image to be displayed on the display panel in the second display mode when the pointer image points to the mark image, in the second mode, the processor causes the mark image to be displayed on the display panel in the first display mode when the pointer image does not point to the mark image and causes the mark image to be displayed on the display panel in a third display mode when the pointer image points to the mark image, and the third display mode differs from either the first display mode or the second display mode.

The meter image is displayed in a first mode or a second mode, in the first mode, the processor causes the mark image to be displayed on the display panel by using only the first display mode, and in the second mode, the processor causes the mark image to be displayed on the display panel in the first display mode when the pointer image does not point to the mark image and causes the mark image to be displayed on the display panel in the second display mode when the pointer image points to the mark image.

Described above is an explanation of the present disclosure based on the embodiment. The embodiment is intended to be illustrative only and it will be understood by those skilled in the art that various modifications to constituting elements and processes could be developed and that such modifications are also within the scope of the present disclosure.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2022-034364, filed on Mar. 7, 2022, the entire contents of which are incorporated herein by reference.

What is claimed is:

1. A display apparatus, comprising:
   a display panel adapted to display at least one meter image including a pointer image, constituting a pointer, and a mark image, constituting a mark to which the pointer is adapted to point; and
   a display controller that controls the display panel, wherein
   the display controller causes the display panel to display the mark image in a first display mode when the pointer image does not point to the mark image and causes the display panel to display the mark image in a second display mode when the pointer image points to the mark image,
   the first display mode and the second display mode are different,
   the display controller causes the display panel to display the mark image in the first display mode with a transparency of the mark image in the first display mode being fixed at one value, and
   the display controller causes the display panel to display the mark image in the second display mode with the transparency of the mark image in the second display mode being periodically changed.

2. The display apparatus according to claim 1, wherein the display controller causes the display panel to display the mark image in the first display mode and the mark image in the second display mode in different levels of transparency.

3. The display apparatus according to claim 2, wherein the transparency of the mark image in the second display mode is lower than the transparency of the mark image in the first display mode.

4. The display apparatus according to claim 2, wherein the transparency of the mark image in the second display mode is higher than the transparency of the mark image in the first display mode.

5. The display apparatus according to claim 1, wherein a font of the mark image in the first display mode is different from a font of the mark image in the second display mode.

6. The display apparatus according to claim 1, wherein the at least one meter image includes a first meter image and a second meter image, the first meter image includes a first pointer image that embodies the pointer image and a first mark image that embodies the mark image, and the second meter image includes a second pointer image that embodies the pointer image and a second mark image that embodies the mark image, and the display panel displays the first mark image and the second mark image, switchably using the first display mode and the second display mode.

7. The display apparatus according to claim 1, wherein the at least one meter image includes a first meter image and a second meter image, the first meter image includes a first pointer image that embodies the pointer image and a first mark image that embodies the mark image, and the second meter image includes a second pointer image that embodies the pointer image and a second mark image that embodies the mark image, and the display panel displays the first mark image by using only the first display mode and displays the second mark image by switchably using the first display mode and the second display mode, and the second pointer image is adapted to move faster than the first pointer image.

8. The display apparatus according to claim 1, wherein the mark image includes a first value image indicating a first value and a second value image indicating a second value different from the first value, the display panel
displays the first value image and the second value image in the first display mode when the pointer image does not point to either the first value image or the second value image, displays the first value image in the second display mode and displays the second value image in the first display mode when the pointer image points to the first value image, displays the first value image in the first display mode and displays the second value image in a third display mode when the pointer image points to the second value image, and the third display mode differs from either the first display mode or the second display mode.

9. The display apparatus according to claim 1, wherein the meter image is displayed in a first mode or a second mode, in the first mode, the display panel displays the mark image in the first display mode when the pointer image does not point to the mark image and displays the mark image in the second display mode when the pointer image points to the mark image, in the second mode, the display panel displays the mark image in the first display mode when the pointer image does not point to the mark image and displays the mark image in a third display mode when the pointer image points to the mark image, and the third display mode differs from either the first display mode or the second display mode.

10. The display apparatus according to claim 1, wherein the meter image is displayed in a first mode or a second mode, in the first mode, the display panel displays the mark image by using only the first display mode, and in the second mode, the display panel displays the mark image in the first display mode when the pointer image does not point to the mark image and displays the mark image in the second display mode when the pointer image points to the mark image.

* * * * *